Patented Nov. 17, 1931

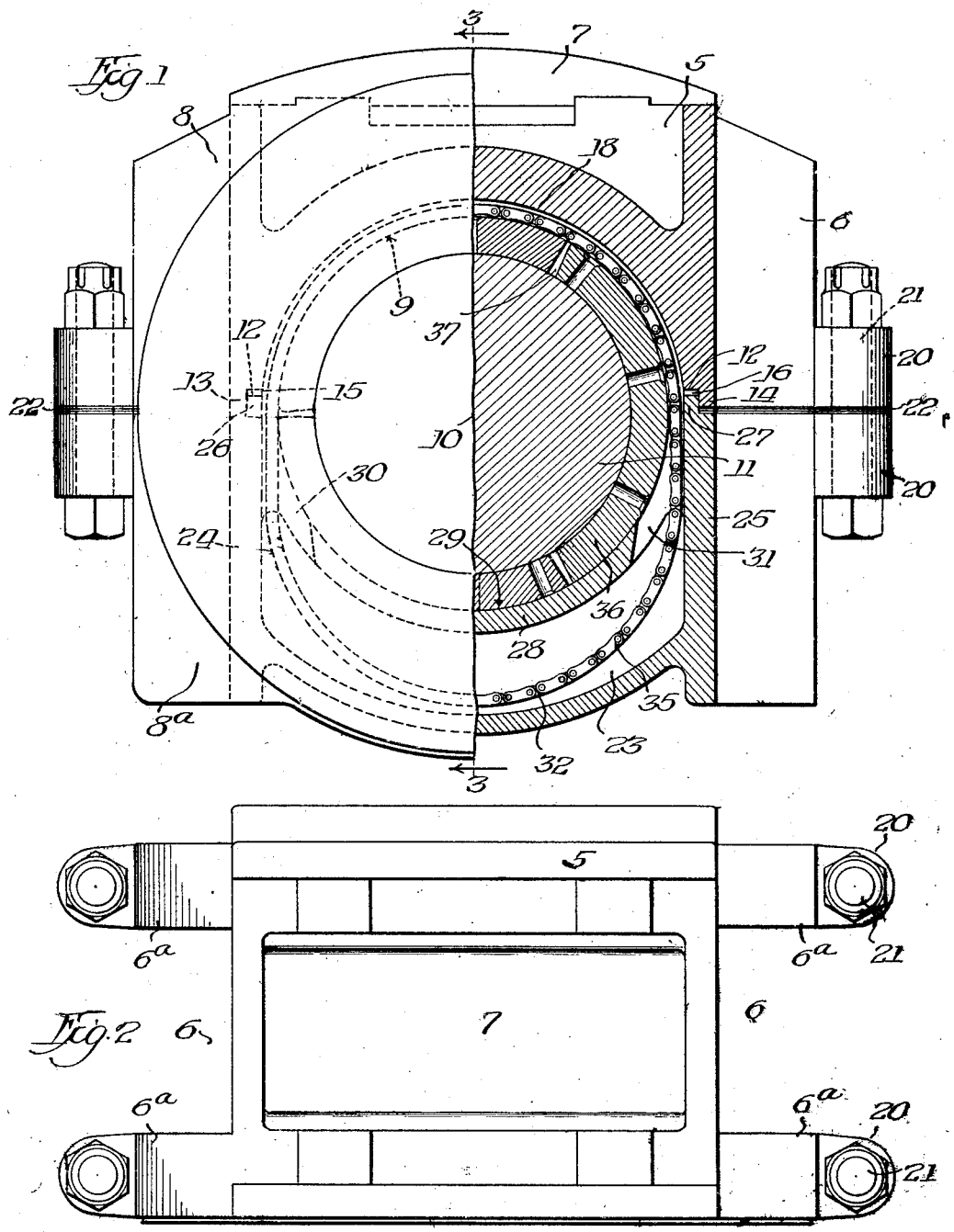

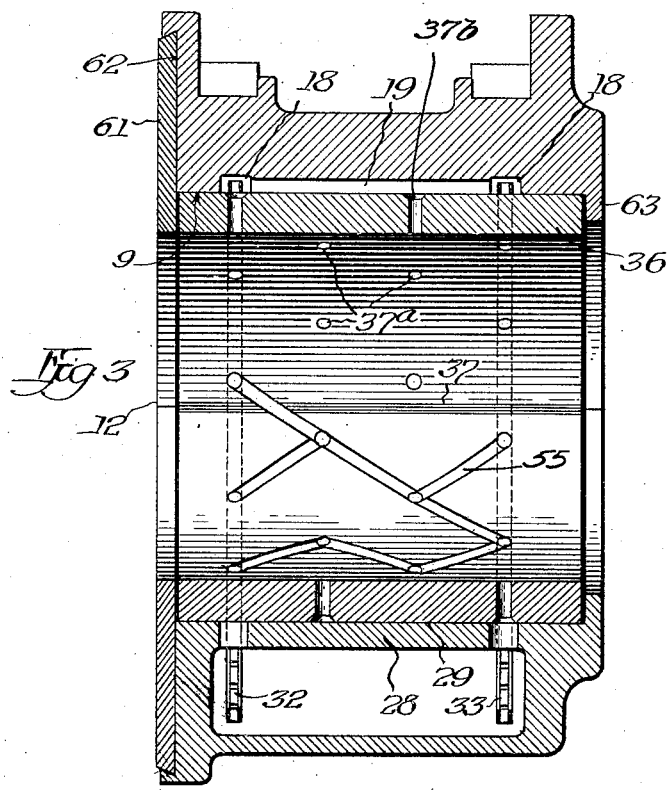
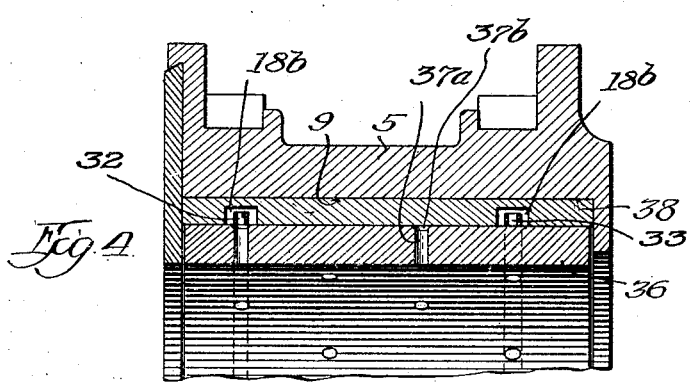

1,831,877

UNITED STATES PATENT OFFICE

HENRY E. MUCHNIC, OF ATCHISON, KANSAS, ASSIGNOR TO THE LOCOMOTIVE FINISHED MATERIAL COMPANY, OF ATCHISON, KANSAS, A CORPORATION OF KANSAS

LOCOMOTIVE DRIVING BOX

Application filed October 18, 1926. Serial No. 142,196.

This invention relates broadly to bearings and more particularly to that type of bearing commonly employed in locomotives and termed a driving journal box, this invention specifically relating to an improved structure of the bearing and supporting means which includes improved lubricating means.

This application is a continuation in part of my application Serial No. 128,223.

It will be understood by those skilled in the art that in a steam locomotive the driving wheel axles are supported for rotation in parallel frames provided with recesses which receive the driving box in which the journal bearing, that is, the brass, is secured, by pressing. Many attempts have been made to reduce and eliminate the distortion of the "brass" due to pounding, it being common practice to provide a bearing brass which overlies the axle and which receives substantially all of the pressure of the locomotive frames on the axles and these bearing brasses have in most instances and in practically all railway practice today been made substantially semi-circular, that is, only the upper part of the bearing actually is a bearing. In this type of driving box, the brass, owing to the longitudinal thrust, tends to become pounded out of shape.

In order to overcome the disadvantages of the present driving box I have provided a device hereinafter described, and its principal objects and advantages reside in the provision shown of an improved type of driving box including the bearing itself and associated elements; the provision of an improved driving box characterized by the embodiment therein of a substantially continuous bearing, that is, a bearing "brass" which completely encircles the axle; the provision of an improved driving box bearing in which the bearing member is floating; that is, revoluble in the box both relatively to and with the axle or shaft; the provision of an improved bearing in which both the "sides", "top", and "bottom" of the bearing function to eliminate the pounding and consequent distortion of the bearing in service; the provision of an improved driving box of the character described in which a revoluble bushing (brass) is employed to eliminate concentrated wear, that is, the concentration of the wear of the bearing in one spot, the provision of an improved bearing having automatic lubricating means; and the provision of a bearing of the character described which is substantially continuous and whereby strains are thereby distributed throughout the bearing member and the life of the bearing therefore increased.

In the prior art devices known to me, when repairing a locomotive driving box, that is, renewing the brass, it is necessary that the wheels and axle be dropped either into a pit or the whole locomotive hoisted off the wheels in order that the driving box may be removed from the frame for receiving the new brass. In the present invention, I provide an arrangement whereby renewal of the brasses may be simply accomplished by jacking up the box against the tension of the springs, blocking the springs and allowing the box to be freely moved above the axle so as to remove the worn brasses and replace the same with new brasses, this feature being set forth hereinafter in detail.

This invention is furthermore particularly characterized by the provision of an improved multi-part driving box, which is capable of adjustment of the parts for taking up wear; and the provision of improved capillary feed lubricating means incorporated as a part of the bearing and for presenting a continuously changing lubricant conductor to the axle.

The foregoing and such other objects and advantages as may appear or be pointed out as this description proceeds are attained by the structure shown in the accompanying drawings, in which:

Figure 1 is a half elevational and vertical sectional view of the device of this invention;

Figure 2 is a top plan of the same;

Figure 3 is a vertical sectional view taken on the line 3—3 of Figure 1, looking in the direction indicated by the arrows; and Figure 4 is a fragmentary view similar to Figure 3, illustrating an alternative form of the invention.

Referring now more particularly to the drawings, I provide a box member, generally designated 5, this box member being generally rectangular in contour and provided at its lateral edges with vertical channels 6—6 which afford flanges 6a—6a between which the vertical lugs of the locomotive frame are received whereby the box may vertically move against the usual spring elements. The upper portion of the driving box 5 is provided with a channel 7 in which the usual spring yoke, not shown, may be received.

The box 5 is formed preferably in two parts 8 and 8a, upper and lower halves, and is provided at its medial portion with a transverse semi-cylindrical recess 9 forming in the upper half 8, a surface having the center 10 of the driving axle 11 as its center of curvature. The surface 9 is substantially semi-cylindrical and terminates at or adjacent the points 12—12, the end portions of the box 5 being there formed with vertical side walls 13 and 14, which latter at their inner portions are formed to afford recesses 15 and 16, respectively.

The surface 9 is provided with one or more circumferential channels 18—18 connected by longitudinal grooves 19, for a purpose which will presently appear.

The lower part 8a of the box is formed with outer vertical channels complemental to those in the upper portion to afford the channels 6 described. On the flanges 6a, 6a of the upper and lower parts 8 and 8a complemental apertured lugs 20, 20 are provided which receive bolts 21, 21 for clamping the upper and lower sections together. Shims 22 are placed between the upper and lower parts so that when the box wears in use, one or more of these shims may be removed for tightening the bearing.

The bottom part 8a is provided with a chamber or cellar 23 containing a suitable lubricant, said member 8 having vertical side walls 24, 25, provided with extensions 26, 27, which seat in the recesses 15 and 16 with sufficient clearance to allow for taking up wear. The bottom member 8a is further provided with a top wall 28, having a curved bearing surface 29, complemental to and forming substantially a continuation of the surface 9.

The wall 28 is provided with the apertures 30 and 31 for accommodating the lubricant conductors, which are preferably roller chains 32 and 33 which extend into the cellar 23 and over the sectionalized bearing member 34 (described hereinafter) in the channels 18. These chains are provided each with one separable link 35 for an obvious purpose.

The bearing proper of the present invention preferably includes the bearing member 36 which latter is, as shown in Figure 1, made up of a plurality of sections forming a substantially complete annulus, the bearing member being termed a "brass" because it is usually made of brass and is divided, as indicated at 37, 37, into three sections, the joints being substantially 120° apart. Any number of sections desired may be employed but I have found that this construction facilitates renewal of the bearing member and at the same time does not provide an undesirable number of joints. The bearing member, though removable, of course snugly engages the axle 11 and said bearing member is freely revoluble both with and relatively to the axle and relatively to the box.

In the construction of the sections of the brass 36, I find it desirable to first employ an annulus of brass and to turn the same on its inside diameter accurately to snugly fit the locomotive axle or shaft as the case may be. I then saw the annulus into three sections by making saw cuts apertured 120° apart and allowing thereby a clearance between the adjacent ends of the sections so that no distortion or binding, can take place due to expansion when heated. By forming the bearing member 36, accurately to fit the axle at the outside, it is not necessary for the bearing member to become worn in service but the sections thereof fit the axle.

Again reverting to the bushing or brass 36, it will be observed that the latter between its joints 37 is formed with a plurality of complemental ports 37a which form passageways for the lubricant introduced between the liner and the bushing to pass to the surface of the axle 11, I also finding it convenient and desirable to internally groove the surfaces of the sections of the bushing as indicated at 55 for hastening the distribution of the lubricant throughout the bearing surface. As will be observed from an inspection of the drawings, the openings or ports 37a are provided with enlarged outer portions or mouths 37b so that the lubricant finds easy access to these ports from the passageways 19.

Upon reference to Figure 4 it will be observed that a steel liner in the form of a cylindrical sectionalized member 38 substantially completely encircles the bushing or bearing member 36, said steel liner being formed preferably in two halves and having adjacent ends in abutment and fixed on the box.

In the present instance the liner 38 instead of the surface 9 is provided with the grooves 18b, 18b, for accommodating the chains 32 and 33.

At the end of the box toward the hub of the driving wheel I provide an outer liner 61 formed in two parts and lying in a complemental recess 62 in the adjacent face of the box 5, said liner being freely revoluble. The liner 61 prevents longitudinal movement of the bearing member 36 in one direction and a flange 63 prevents movement thereof in the opposite direction.

It will be observed that the advantages accruing to this invention reside particularly in the absence of any pound on the bearing due to uneven supporting of the axle and any displacement of the axle in the bearing longitudinally of the locomotive being taken up by some part of the bushing member which is, of course, constantly changing.

In assembling the device of this invention, the manner of assembly depends, of course, on whether this is being done originally when the device is placed on the axles or whether it is done to an engine for repair purposes. As one of the principal advantages of this invention resides in the facility with which repairs can be made, it will be pointed out that assuming the device is in position on a locomotive, as shown, the bolts 21 are first removed and the cellar member 23 allowed to drop down. The driving box is then jacked up against the tension of the locomotive springs, not shown, and a block may then be placed between the springs and the top of the locomotive frame, thereby taking the weight of that part of the engine off the driving box whereupon it is freely movable relatively to the axle and to the locomotive frame. The retaining ring 61 is then removed and the worn bushings, and, if necessary, the liners, removed along the axle. New bushings and liners are then inserted in position, and the cellar member raised, and the bolts 21 inserted and tightened. The springs will then again be jacked up and the retaining block removed, allowing the spring yoke to again engage the upper part of the driving box, and the engine is again ready for service. It will be obvious that the advantages are in this structure over the prior art device wherein it is necessary to drop driving wheels into a pit in order to remove the journal box for replacing the brass. It will be understood, of course, that the liner 38 is not absolutely essential but is employed to eliminate wear on the driving box itself.

Having thus described my invention and illustrated its use, what I claim as new and desire to secure by Letters Patent is:

1. In a bearing, a revoluble bearing member, an annular fixed liner encircling said bearing, and a lubricant conductor passing over said bearing member and beneath said liner.

2. In a bearing, an upper and lower section disconnectibly connected, a liner supported by said sections, a revoluble sectionalized bearing member supported by said sections and having lubricant passageways, a lubricant cellar in the lower section, and a flexible moving lubricant conductor passing through said cellar over said bearing member and beneath said liner at said passageway.

3. In a bearing, an upper and a lower section disconnectibly connected, a liner supported by said sections and provided with inwardly facing grooves, a revoluble sectionalized bearing member supported by said sections and having lubricant passageways, a lubricant cellar in the lower section, and a flexible moving lubricant conductors passing through said cellar over said bearing member and beneath said liner in the grooves thereof adjacent to said passageways.

4. In a bearing, an upper and lower section disconnectibly connected, said lower section containing a lubricant chamber, a stationary liner supported by said sections, a revoluble sectionalized bearing member supported by said sections and having direct contact with said liner, said bearing member having a plurality of symmetrically arranged perforations, said liner having a circumferential passageway in its inner surface adjacent to the perforations in said bearing member, and a flexible moving lubricant conductor lying in the circumferential passageway in direct contact at said perforations with said bearing member to be moved thereby in delivering lubricant directly to said perforations, said lubricant conductor passing through said lubricant chamber.

In testimony whereof, I have hereunto signed my name.

HENRY E. MUCHNIC.